United States Patent [19]
Weber

[11] 3,831,018
[45] Aug. 20, 1974

[54] MULTI-PURPOSE VEHICLE LAMP HAVING SIDE LIGHT EMITTING LENS

[75] Inventor: Bernard R. Weber, Elm Grove, Wis.
[73] Assignee: Wesbar Corporation, West Bend, Wis.
[22] Filed: June 21, 1973
[21] Appl. No.: 372,026

[52] U.S. Cl.................. 240/8.2, 240/8.3, 339/100, 339/244 R
[51] Int. Cl. ....... B60g 1/32, H01r 9/06, H01r 11/20
[58] Field of Search ................ 240/8.2, 8.3, 57, 7.1; 339/100, 244; 296/28; 180/89

[56] References Cited
UNITED STATES PATENTS

| | | | |
|---|---|---|---|
| 3,087,051 | 4/1963 | Black.............................. | 240/8.2 X |
| 3,093,320 | 6/1963 | Knapp.................................. | 240/8.2 |
| 3,114,182 | 12/1963 | Trautner et al...................... | 240/8.2 |
| 3,222,512 | 12/1965 | Dickson.............................. | 240/8.2 |
| 3,321,618 | 5/1967 | Goldbaum et al................... | 240/8.2 |

*Primary Examiner*—Richard A. Wintercorn
*Attorney, Agent, or Firm*—James E. Nilles

[57] ABSTRACT

A vehicle lamp is provided which is usable as a side marker, clearance, combination side marker and clearance lamp, or identification lamp on a vehicle such as a trailer. The lamp is adapted to be mounted, depending on its use, at the side, front or rear of the vehicle or at a corner position 45° to the longitudinal centerline of the vehicle. The lamp comprises a base for connection to the vehicle (or a suitable support thereon), a four-sided translucent lens cover releasably engageable by snap-on connector means to the base, said lens being adapted to emit light from the end thereof as well as from all four sides, a bulb for disposition between the base and the lens cover, and bulb support means on the base for mounting the bulb with its base extending upwardly and on a slight angle so that sufficient light is emitted from all sides of the lens cover.

8 Claims, 31 Drawing Figures

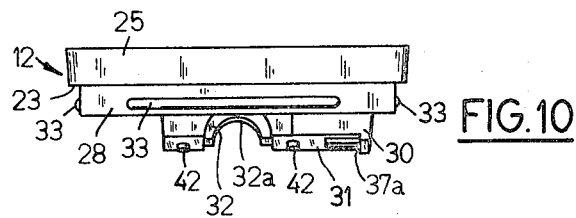
FIG. 10
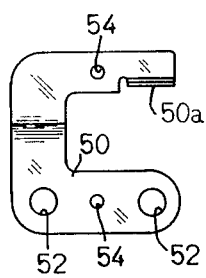
FIG. 9B
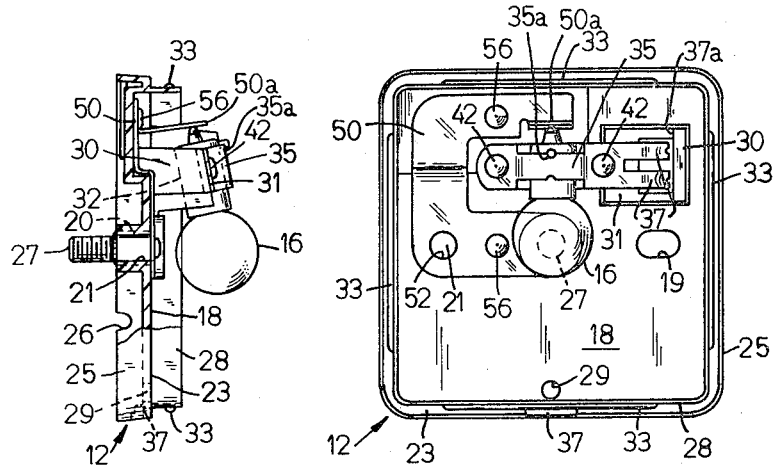
FIG. 11   FIG. 9   FIG. 13
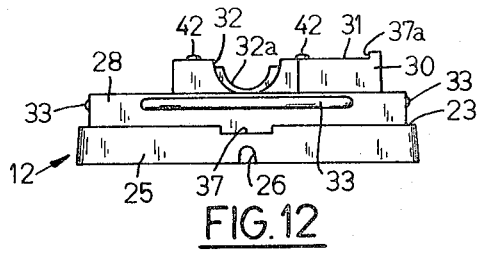
FIG. 12
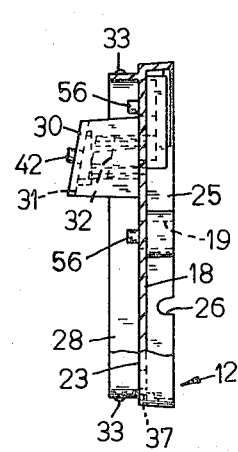
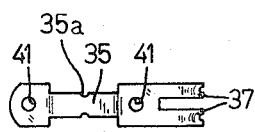
FIG. 9A
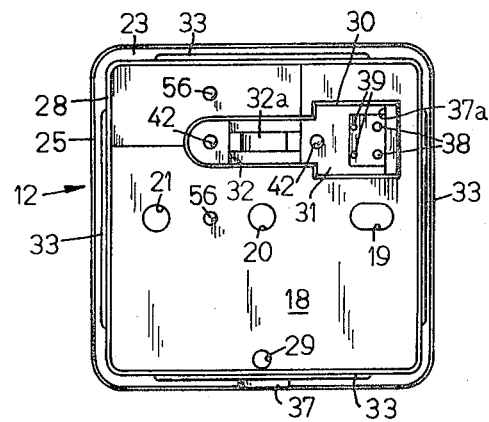
FIG. 14

MULTI-PURPOSE VEHICLE LAMP HAVING SIDE LIGHT EMITTING LENS

BACKGROUND OF THE INVENTION

1. Field of Use

This invention relates to vehicle lamps such as are used as side marker, clearance, combination clearance and side marker, or identification lamps on vehicles such as trailers.

2. Description of the Prior Art

In order to comply with federal, state and local regulations and with industry standards, various types of vehicles, such as trailers, are required to have lamps of specified light emitting characteristics and color located at certain positions on the vehicle to provide prescribed lighting signals and functions. For example, Federal Motor Vehicle Safety Standard No. 108 issued by the U.S. Department of Transportation (DOT) effective Jan. 1, 1972, deals with lamps, reflective devices and associated equipment for certain vehicles, including certain types of trailers, and specifies requirements for original and replacement lamps, reflective devices and associated equipment necessary for signalling and for the safe operation of such vehicles during darkness and other conditions of reduced visibility. This standard, among other things, specifies the required lighting equipment and its location for certain types of trailers 80 or more inches in overall width and also for those less than 80 inches in overall width. This federal standard also indicates and incorporates by reference the applicable SAE (Society of Automotive Engineers) standard or recommended practice, such as, for example, Standard SAE J592e dealing with test methods and requirments for clearance, side marker, combination clearance and side marker, and identification lamps for certain types of trailers and other vehicles. Standard SAE J592e appears in the SAE Handbook 1973 Edition, published by the Society of Automotive Engineers, Inc., Two Pennsylvania Plaza, New York, N.Y., 10001.

In SAE Standard J592e, clearance lamps are those which show to the front or rear of a vehicle, mounted on the permanent structure of the vehicle as near as practical to the upper left and right extreme edges to indicate the overall width and height of the vehicle. Side marker lamps are those which show to the side of the vehicle as near as practical to the front and rear edges to indicate the overall length of the vehicle. Combination clearance and side marker lamps are single lamps which simultaneously fulfill the requirements of clearance and side marker lamps. Identification lamps are lamps used in groups of three, in a horizontal row, which show to the front or rear or both, and spaced a predescribed distance, mounted on the permanent structure as near as practicable to the vertical centerline and the top of the vehicle to identify certain types of vehicles.

More specifically, requirements for certain trailers in accordance with DOT Standard 108 and SAE Standard 592e are as follows: Trailers less than 80 inches wide require, among other things; two red side marker lamps, one on each side as far to the rear as practicable; and two amber side marker lamps, one on each side as far forward on the frame as practicable. Trailers 80 or more inches in width require, among other things; the same side marker lamps as trailers less than 80 inches wide plus on the front and rear two amber lamps on the front, two red lamps on the rear to indicate the overall width of the vehicle, one on each side of the vertical center line, at the same height, and as near the top as practicable; and three red identification lamps on the rear on the vertical center line in a horizontal row with lamp centers spaced not less than 6 nor more than 12 inches apart. However, under DOT Standard 108, boat trailers need not be equipped with both front and rear clearance lamps provided an amber (to front) and red (to rear) clearance lamp is located at or near the midpoint on each side of the trailer so as to indicate its extreme width. Where practicable, combination fixtures may incorporate two or more lamps together, except that clearance lamps may not be combined with the identification lamps.

In practice, such lamps typically comprise a mounting base having a bulb mounted thereon and a lens cover of appropriate color secured to the base and covering the bulb. Furthermore, such lamps were sometimes designed and constructed to meet the physical configuration and photometric requirements dictated by their particular application either as clearance, side marker, combination clearance and side marker, or identification lamps. Consequently, each type of lamp, depending on its application, sometimes differed in configuration, component parts, size and mounting hardware required. Obviously, these differences were not conducive to standardization as regards parts, inventory, manufacturing processes, assembly techniques and so forth.

SUMMARY OF THE INVENTION

In accordance with the present invention there is provided a vehicle lamp which is usable, assuming a lens cover of appropriate color, as a side marker, clearance, combination side marker and clearance or identification lamp. Broadly considered, the lamp in accordance with the invention comprises a base for connection to the front, rear or side of a vehicle, or at a position 45° with respect to the longitudinal centerline of the vehicle, a translucent lens cover releasably engageable by snap-on connector means to the base, said lens being adapted to emit an appropriate amount of light from the end thereof as well as from every side, a bulb for disposition between the base and the lens cover, and bulb support means on the base for mounting the bulb with its base extending upwardly and on a slight angle so that sufficient light is emitted from all sides of the lens cover.

More specifically, the base, which is preferably formed of molded plastic, comprises a flat rectangular portion having mounting holes therethrough adapting it for physical and electrical ground connection to an appropriate place on the vehicle, as by means of a bolt or rivet. The base further comprises a rear flange which is disposed around the periphery of the base and extends rearwardly from the flat portion. The rear flange has one or more wire accommodating holes therethrough. The base further comprises a forward flange which is rectangular and extends forwardly from the flat portion of the base. The lens cover, which is preferably formed of molded plastic, comprises four substantially flat side portions and an integrally formed convex face portion, with light diffusion or dispersion means integrally formed or molded on the inner or outer surface of the convex face portion of the lens. Cooperatively engageable releasable snap-on connection means are provided on the base and on the lens cover for connecting them together. The lens cover is designed symmetrically so it can be snapped onto base in any of four possible positions and still meet all photometric requirements. The connector means take the form of a plurality of integrally formed connecting ribs disposed on the outer surface of the forward flange of the base member and complementary grooves formed on the inner surface of the flat side portions of the lens cover. The bulb for use in the lamp is conventional in form and preferably comprises a cylindrical bayonet type base and a substantially spherical globe. The bulb support means comprises a molded projection integral formed with and extending from the front surface of the flat portion of the base and having a semicircular cutout for accomodating the bayonet base of the bulb. The bulb support means further comprises a conductive strap rigidly secured, as by sonic welding, to the projection for engagement with the bulb base. The conductive strap is provided with one or more electrical terminals thereon which are accessible as push-in terminals for connection wires from the rear side of the flat portion of the base through one or more holes formed in the projection. With the flat portion of the base vertically disposed, the bulb support means hold the bulb in a downward orientation and so that the axis of the bulb is transverse or sloped with respect to the plane of the flat portion of the base. An electrical ground connector strap is rigidly secured to the inner surface of the flat portion of the base, as by sonic welding, to connect the center terminal of the bulb to the bolt or rivet which is used to secure the lamp base to the vehicle or to a mounting bracket thereon.

The vehicle lamp in accordance with the invention is usable as hereinbefore mentioned either as a side marker, clearance, combination clearance and side marker, or identification lamp. The lamp is constructed so as to employ a minimum number of mass producible, standardized component parts. The lens cover is rigidly and securely connected in a substantially weather-tight fashion to the base, but is readily removable therefrom, as by means of a coin or screwdriver, to permit mounting or removal of the lamp from the vehicle or suitable support bracket, or for changing the bulb. The lens cover is mountable in any of four possible positions with respect to the base without affecting its light-emitting properties. The construction of the lens cover is such that signal light is visible from the face thereof, as well as from all sides thereof. The orientation of the bulb is such as to permit its mounting within the lamp using a minimum amount of space but permitting sufficient emission of light in all directions. The light dispersion facets integrally formed on the inner or outer side of the convex end surface of the lens cover are designed so as to insure uniform light dispersion through a wide angular range at a predetermined light intensity from the lamp in accordance with SAE and DOT photometric requirements. Other objects and advantages of the invention will hereinafter appear.

DRAWINGS

FIG. 9 is a view similar to FIG. 14 but showing the lamp base with all electrical and mechanical components and a bulb in place thereon;

FIG. 9A is a top plan view of the bulb strap shown in FIGS. 9 and 11;

FIG. 9B is a top plan view of the ground stap shown in FIGS. 9 and 11;

FIG. 10 is a plan view of the top of the base shown in FIG. 9;

FIG. 11 is a view of the left side of the base shown in FIG. 9 with portions broken away to show detail;

FIG. 12 is a plan view of the bottom of the base shown in FIG. 9;

FIG. 13 is a view of the right side of the base shown in FIG. 9 with portions broken away to show detail;

FIG. 14 is a front elevational view of the lamp base with the lens cover removed and with all separate electrical and mechanical components removed therefrom;

DESCRIPTION OF A PREFERRED EMBODIMENT

Figure 1:
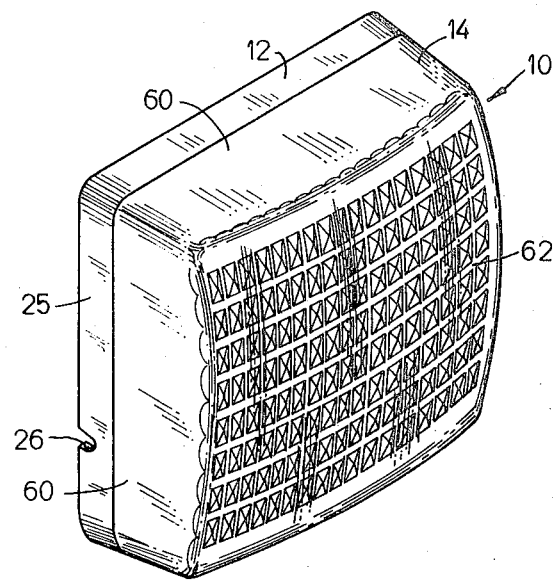
FIG. 1 is a perspective view of a vehicle lamp in accordance with the invention taken generally from the left front side of the lamp.
Figure 2:
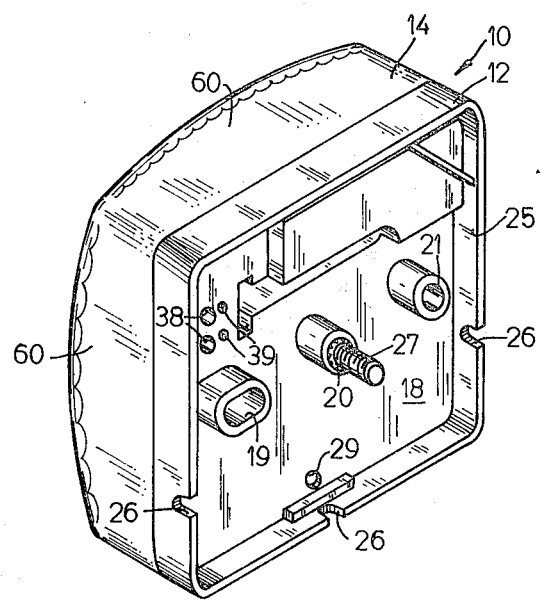
FIG. 2 is a perspective view of the same lamp taken generally from the right rear side of the lamp.
Figure 1A:
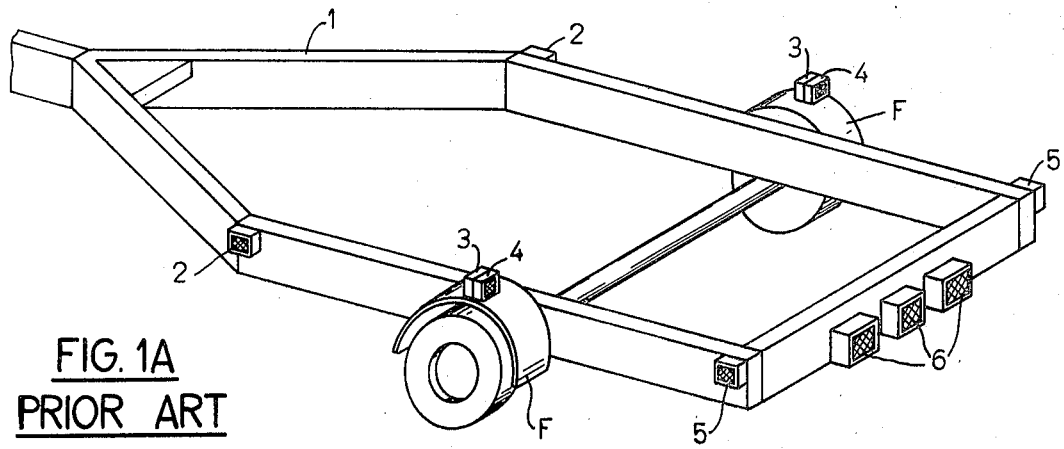
FIG. 1A is a perspective view of a vehicle, such as a trailer, showing prior art type vehicle lamps mounted thereon in various prescribed positions.

FIG. 1A is a perspective view of a vehicle, such as a trailer 1, understood to be 80 or more inches in width, showing a prescribed arrangement of conventional prior art side marker lamps 2, conventional amber clearance lamps 3, conventional red clearance lamps 4, conventional red side marker lamps 5, and a group of three conventional red identification lamps 6. The lamps 2, 3, 4, 5 and 6 are understood to be prior art types of lamps which are designed to be viewed only from the direction in which they face, therefore, four lamps are required on each of the left and right sides of vehicle 6. In practice, the lamps 2 and 5 are combined with appropriately colored reflex reflectors. It should be noted that the amber side marker lamps 2 are as far forward on the frame as practicable, that the clearance lamps 3 and 4 are near the midpoint of the frame and at the extreme width i.e., on the outer edges of the fender F.

Figure 1B:
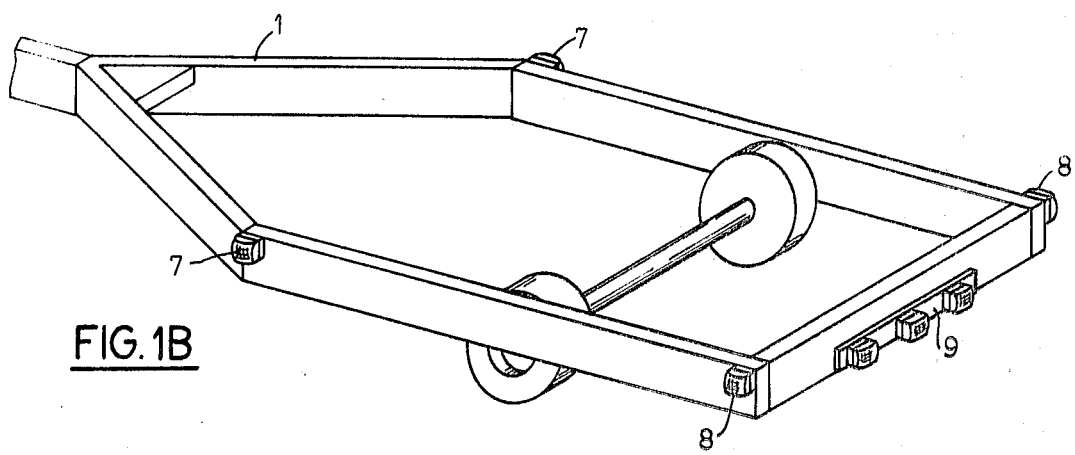
FIGS. 1B and 1C are perspective views of a vehicle, such as a trailer, showing vehicle lamps in accordance with the invention mounted thereon in various prescribed positions.

FIG. 1B is a perspective view of a vehicle, such as a trailer 1, understood to be 80 or more inches in width, showing one prescribed arrangement of amber and red combination clearance and side marker lamps 7 and 8, respectively, in accordance with the invention, and a group of three red identification lamps 9 in accordance with the invention. It should be noted that the amber lamps 7 are as far foward on the frame as practicable and are at the extreme width of the frame. Similarly, the red lamps 8 are as far rearward on the frame as practicable and are at the extreme width of the frame.

Figure 1C:
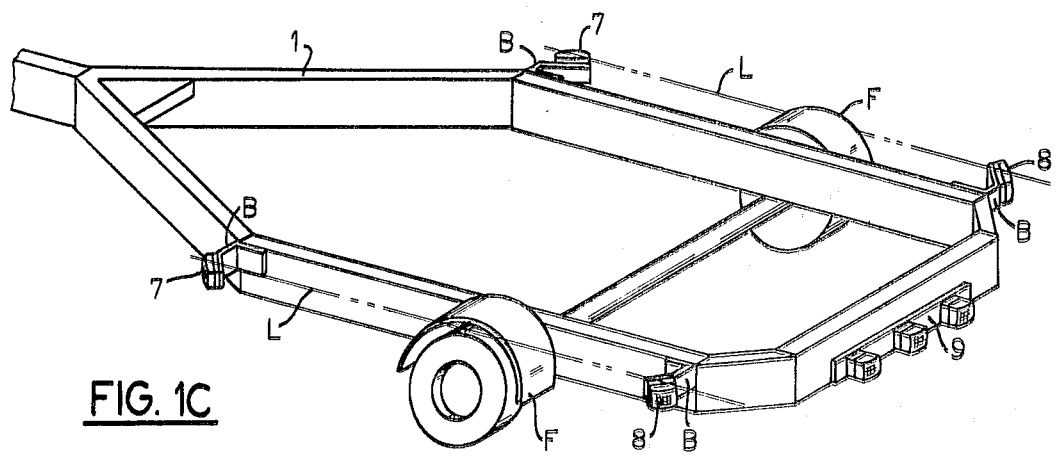
Figure 3:
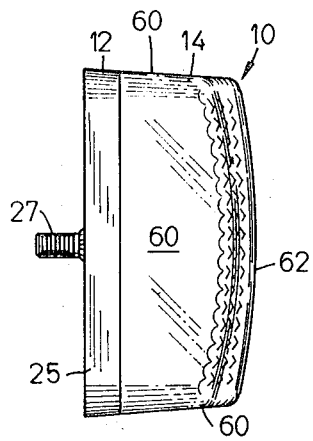
FIG. 3 is a top plan view of the lamp.
Figure 6:
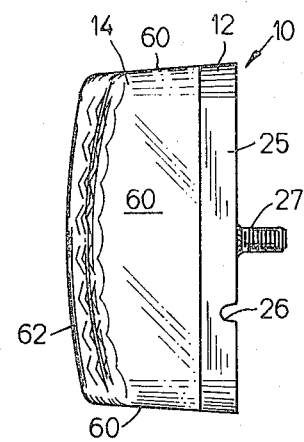
FIG 6 is a plan view of the right side of the lamp.
Figure 4:
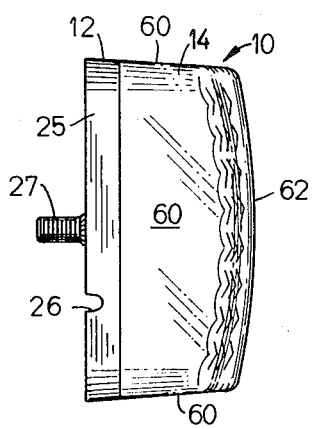
FIG 4 is a plan view of the left side of the lamp.
Figure 7:
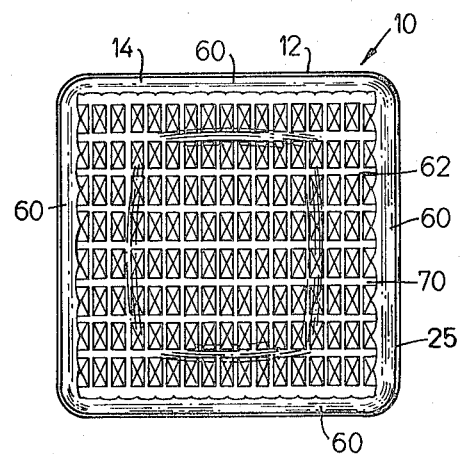
FIG. 7 is a front elevational view of the lamp.
Figure 5:
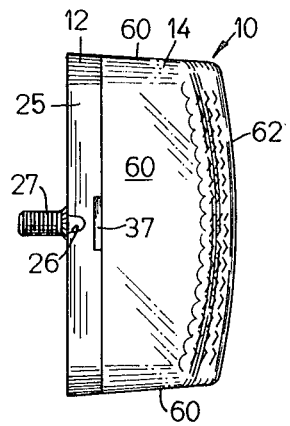
FIG 5 is a plan view of the buttom side of the lamp.
Figure 8:
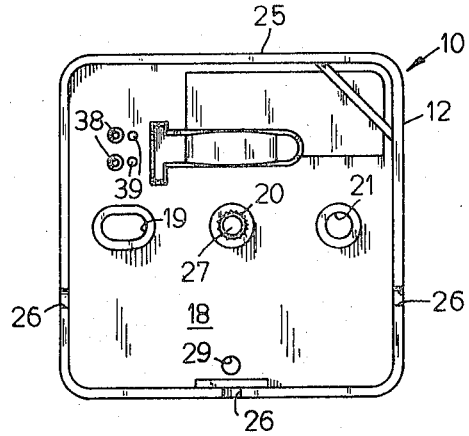
FIG. 8 is a plan view of the rear of the lamp.
Figure 15A:
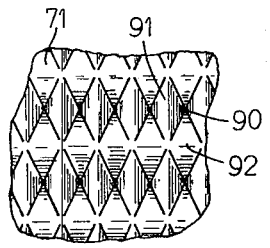
FIG. 15A is an enlarged plan view of a portion of the inside lens cover configuration.
Figure 15:
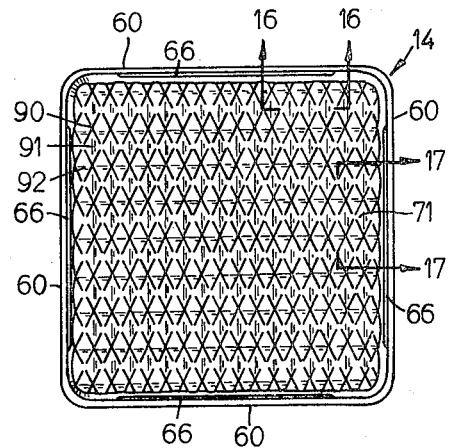
FIG 15 is a plan view of the inside of the lens covers.
Figure 15B:
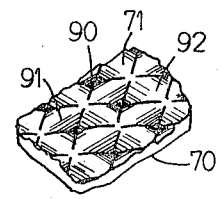
FIG. 15B is an isometric view of the portion shown in FIG. 15A.
Figure 16:
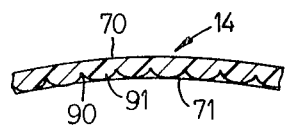
FIG 16 is an enlarged cross-sectional view of the lens cover taken on line 16—16 of FIG. 15.
Figure 17:
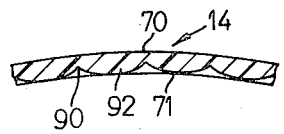
FIG. 17 is an enlarged cross-sectional view of the lens cover taken on line 17—17 of FIG. 15.

FIG. 1C is a perspective view of a vehicle, such as a trailer 1, showing another prescribed arrangement of amber and red combination clearance and side marker lamps 7 and 8, respectively, and red identification lamps 9 in accordance with the invention. In FIG. 1C, each lamp 7 and 8 is mounted, for example, on a bracket B at a corner of trailer 1 at a 45° angle to the longitudinal axis of the trailer. The lamps 7 and 8 are as near as practicable to the front and rear edges of the frame, respectively, and are at the extreme width of the trailer i.e., in line with the outer edges of the fenders F, as indicated by lines L.

Comparison of FIGS. 1B and 1C with FIG 1A shows that use of lamps in accordance with the invention which are visible from the sides as well as the front, permits two lamps on each side of the trailer to be eliminated, this features being especially important for use in boat trailers.

It is to be understood that in FIGS. 1A, 1B and 1C that certain other lamps or signalling devices normally required at or near the rear of the trailers have been omitted for the sake of clarity and simplicity of explanation. Thus, tail lights, stop lights, turn signals, reflex reflectors and a license plate have been omitted.

Referring to FIGS. 1 through 8, there is shown a vehicle lamp 10 in accordance with the present invention (and representative of the lamps 7, 8 and 9 hereinbefore referred to) which is usable as a side marker, clearance, combination side marker and clearance or identification lamp on a vehicle such as trailer 1. Broadly considered, lamp 10 comprises a base 12 adapted for connection either directly to the vehicle or on a mounting bracket on the vehicle and a translucent lens cover 14 releasably engageable, as hereinafter described, by snap-on connector means to the base. The lens cover 14 is adapted to emit light from the face end thereof as well as from all four sides and is adapted to be connected in any of four positions to the base. A bulb 16, shown in FIGS. 9 and 11, is disposed between base 12 and lens cover 14. Bulb 16 is a conventional single filament bayonet type low voltage automotive bulb having a spherical globe and a bulb base, including side and bottom terminals. Bulb support means, hereinafter described, are provided on base 12 for mounting the bulb with its base extending upwardly and with the bulb axis on a slight angle from vertical so that sufficient light is emitted from all four sides of lens cover 14, as well as from the lens cover face.

More specifically, as FIGS. 2, and 8 through 14 show, the base 12, which is preferably formed of molded plastic, comprises a flat rectangular (i.e., square) portion 18 having three selectively usable mounting holes 19, 20 and 21 (one oblong and two circular) adapting it for physical and electrical connection to an appropriate place on the vehicle or to a mounting bracket on the vehicle. A mounting and grounding bolt 27, in the form of a ring bolt, is shown as press-fitted in hole 20. However, other types of fasteners such as conventional bolts or rivets can be used in holes 19, 20 or 21. The base further comprises an integrally formed continuous rear flange 25 which is disposed around the generally rectangular periphery of the base portion 18 and extends rearwardly therefrom. The rear flange 25 has one or more (preferably three, with one on each of three sides) wire accommodating hoels or slots 26 therethrough at its rear edge. Bottom hole 26 also serves as a moisture drain hole. The base 12 further comprises an integrally formed continuous forward flange 28 which is rectangular and extends forwardly from the front surface of flat portion 18 of the base 12. Base portion 18 is provided with a drain hole 29 therethrough near its bottom edge.

Base 12 is provided with bulb support means which comprise a molded projection 30 integrally formed with and extending from the front surface of flat portion 18 of base 12 near the upper side or edge thereof. The top surface 21 of projection 30 is sloped, as FIGS. 11 and 13 show, and is provided with a semi-circular cutout 32 having a semicircular shoulder 32a therein, also sloped, for accomodating the bayonet base of bulb 16. The ends of shoulder 32a terminate below surface 31 of projection 30 to afford clearance for the bayonets of bulbs 16 when the latter is to be inserted or removed. As FIG. 9 and 11 show, the bulb support means further comprise a strap 35, preferably formed by punching from electrically conductive resilient sheet metal, rigidly secured to the surface 31 of projection 30 for engagement with the bulb base. As FIG. 9A shows, strap 35 is provided with two holes 41 for accommodating two pins 42, shown in FIGS. 10, 12, 13 and 14, integrally formed on top surface 31 of projection 30. The pins 42, when deformed as by ultrosonic welding as shown in FIGS. 9 and 11, rigidly secure strap 35 to surface 31. Strap 35 is also provided with a notch 35a for releasable engagement with one of the bayonets of bulb 16 to hold bulb 16 in place. The other bayonet of bulb 16 bears against a side of shoulder 32a. Strap 35 is provided with two electrical push-in terminals 37 at one end thereof which are accessible for wire connection purposes from the rear side of flat protion 18 of base 12 through wire insertion holes 38 formed in portion 18 and in projection 30. The terminals 37 cooperate with a side wall 37a formed on projection 30. Wire release holes 39 are provided adjacent the holes 38 to admit a tool for disengaging the terminals 37 from wires. When flat portion 18 of base 12 is vertically disposed, as when mounted, the bulb support means hold the bulb in a downward orientation, as shown in FIGS. 9 and 11, so that the axis of summetry of the bulb is downwardly and outwardly sloped or slanted with respect to the plane of the flat portion 18 of base 12. The bulb support means also position the bulb globe substantially over the center point of base 12. A generally U-shaped electrical ground connector strap 50 is rigidly secured to the inner surface of flat portion 18 of base 12 to electrically connect the bulb base terminal to the permanently mounted ring mounting bolt 27 which is used to mechanically and electrically connect lamp 10 to the vehicle or to a mounting bracket thereon. Strap 50 is provided with two bolt mounting holes 52 (either of which is usable for a ring bolt such as 27, a conventional bolt or rivet) and with two holes 54 for accommodating two pins 56 integrally formed on the front surface of flat portion 18 of base 12 and ultrosonically deformable as shown in FIG. 9 for rigidly securing strap 50 in position. Strap 50 has a resiliently movable upturned end 50a for electrical connection with the bulb base terminal and which also serves to bias the bulb into firm engagement with the bulb support means.

Forward flange 28 on lamp base 12 cooperates with base portion 18 to provide a shoulder or ledge 23 against which the edge of lens cover 14 rests when the latter is in place on base 12. Forward flange 28 is also provided on the four major exterior surfaces thereof with integrally formed molded projections or ribs 33 which are part of the snap-on connector means for lens cover 14, as hereinafter described. Ledge 23 is indented as at 37 to provide a space beneath an edge of lens cover 14 which enables insertion of a tool, such as a screw driver or coin, beneath the edge of lens cover 14 to effect its release from the snap-on connection means.

Figure 18:
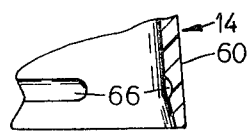
FIG. 18 is an enlarged fragmentary view of an inside corner of the lens cover.
Figure 19:
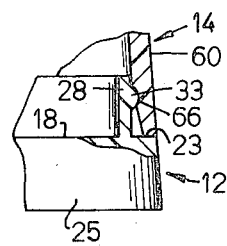
FIG. 19 is an enlarged fragmentary view partly in cross-section showing the means by which the lens cover is secured to the base.
Figure 24:
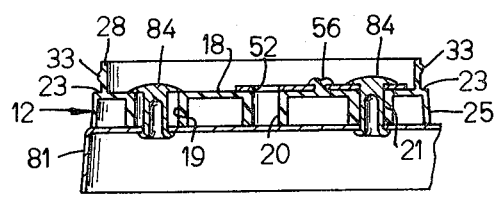
FIG. 24 is an enlarged, fragmentary, cross-sectional view taken on line 24—24 of FIG 22.
Figure 20:
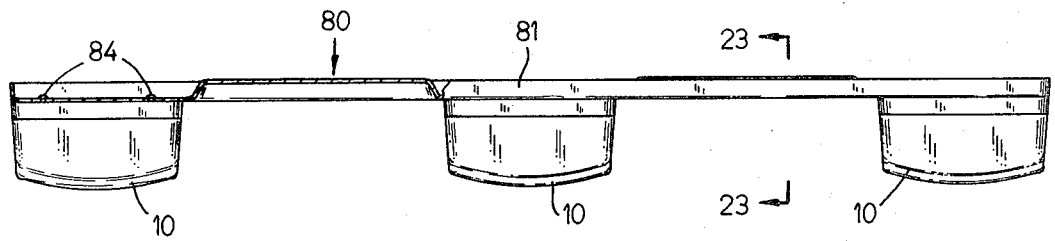
FIG 20 is a top plan view of three vehicle lamps in accordance with the invention mounted on a support bracket to provide an identification lamp assembly.
Figure 21:
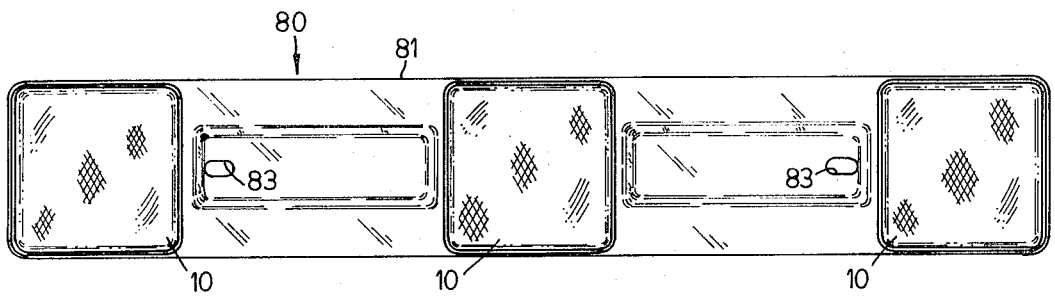
FIG. 21 is a front elevational view of the assembly shown in FIG. 20.
Figure 22:
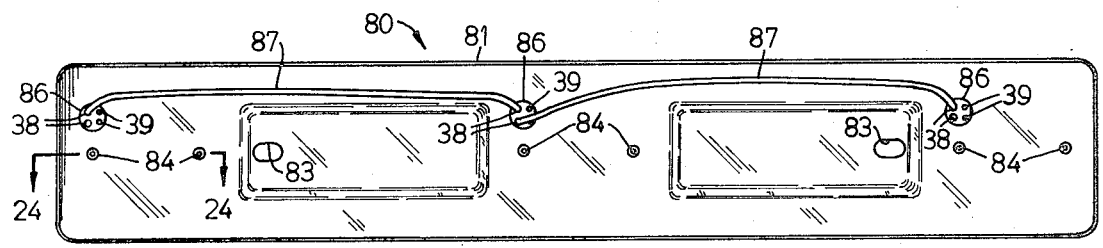
FIG. 22 is a rear elevational view of the assembly shown in FIGS. 20 and 21.
Figure 23:
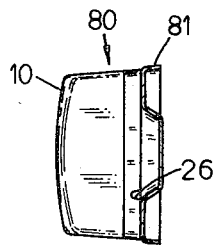
FIG. 23 is an end elevational view partly in section taken on line 23—23 of FIG. 20.

The lens cover 14 for use with base 12 comprises four substantially flat side portions 60 and an integrally formed convex face portion 62, with light diffusion or dispersion means, hereinafter described, integrally formed on the inner surface of the convex face portion 62 of the lens cover. Lens cover 14 is preferably fabricated by molding from translucent or transparent plastic of a suitable color for desired signal purposes. As hereinbefore mentioned, and as FIGS. 18, 19 and 24 show, cooperatively engageable releasable snap-on connection means are provided on base 12 and on lens cover 14 for releasably connecting them together. The connector means takes the form of four integrally formed elongated rounded connecting ribs 33 on the outer surface of forward flange 28 of the base 12 and four complementary-shaped grooves 66 formed on the inner surface of the four flat side portions 60 of the lens cover 14. When cover 14 is in place on base 12, each rib 33 engages a corresponding groove 66. The lens cover 14 is releasable from such engagement by insertion of a tool in indentation 37 on base 12 and bending the slightly flexible cover 14 so as to disengage a rib 33 from its groove 66 thereby enabling the other to be easily disengaged. As hereinbefore explained, base 12 and lens cover 14 are symmetrical and lens cover 14 is so designed optically, that it is possible to connect the lens cover to the base in any one of four possible positions and still meet all photometric requirements.

Cover 14 is designed and constructed so that light from bulb 16 is visible from all four sides 60 and from face 62. Both surfaces of each flat side portion 60 are smooth. Light dispersion or diffusion through face 62 is equalized by constructing lens cover 14 as shown in FIGS. 7, 15, 15A, 15B, 16, 17 and 18. As those figures show, the exterior surface 70 of face 62 is smooth and convex, whereas the interior surface 71 is provided with depressions 90 which, as FIGS. 15A and 15B best show, are arranged in horizontal and vertical rows and result in the formation of a plurality of light dispersing pillow blocks 91 and 92. Each depression 90 has four downwardly sloped convex triangularly shaped surfaces.

The vehicle lamp 10 hereinbefore described is usable separately and may be mounted directly (or on a mounting bracket) on a vehicle in a legally prescribed place or several such lamps 10 appropriately arranged horizontally may be employed as identification lamps and may be mounted individually or as part of an assembly 80 on a common support plate 81, as FIGS. 20, 21, 22 and 23 show. In assembly 80, support plate 81 is fabricated of stamped sheet metal and is provided with two elongated mounting holes 83 which adapt it for vehicle mounting. Each lamp 10 is mechanically secured and electrically connected (grounded) to plate 81 by rivets 84 which extend through suitable holes in plate 81 and through the holes 19 and 21, hereinbefore described, in base 12 of lamp 10. Plate 81 is also provided with three wiring access holes 86, each aligned with the wire insertion and release holes 38 and 39, respectively, in base 12 of lamp 10, for accommodating wires such as 87.

The vehicle lamp in accordance with the invention is usable as hereinbefore mentioned either as a side marker, clearance, combination clearance and side marker, or, if arranged in prescribed groups, as an indentification lamp. The lamp is constructed so as to employ a minimum number of mass producable, standarized, interchangeable component parts. The lens cover, which is mountable in any of four positions or orientations, is rigidly and securely connected in a substantially weather-tight fashion to the base, but is readily removable therefrom, as by means of a coin or screwdriver, to permit mounting or removal of the lamp from the vehicle or suitable support bracket, or for changing the bulb. The construction of the lens is such that signal light is visible from the face of the lens as well as from all four sides thereof. The orientation of the bulb is such as to permit its mounting within the lamp using a minimum amount of space but permitting sufficient emission of light in all directions. The light dispersion facets integrally formed on the inner side of the convex surface of the lens are designed so as to insure uniform light dispersion of a predetermined intensity in accordance with prescribed standards from the lamp.

It is to be understood that the lamp arrangements shown in FIGS. 1B and 1C are illustrative only and that other physical arrangements in compliance with legal requirements are mechanically possible with lamps in accordance with the invention.

I claim:

1. In a vehicle lamp: an insulating base comprising a flat base portion having at least one mounting hole therethrough, a forward flange extending forwardly from said flat base portion, and a rear flange extending rearwardly from said flat base portion, said flat base portion having at least one mounting hole therethrough; a translucent lens cover for releasable mounting on said base, said lens cover comprising a face portion and a plurality of side portions; means for releasably connecting said lens cover to said base and comprising first connecting means including ribs on the exterior of said forward flange and second connecting means including grooves on the interior of said side portions of said lens cover; a bulb having a connecting base and a globe mounted between said lens cover and said base, said bulb connecting base comprising two terminals; bulb support means on said base for supporting said bulb so that the longitudinal axis of said bulb is at an inclined angle with respect to said flat portion of said base, said bulb support means comprising a projection integral with said base and extending forwardly from said flat base portion, and an electrically conductive bulb connector strap mounted on said projection and electrically connected to one terminal of said bulb, said projection being provided with a sloped indentation wherein said bulb connecting base is received and with a sloped surface for attachment of said connector strap, said projection being provided with at least one wire insertion hole therethrough from the rear of said flat base portion for accommodating a wire frictionally connectable to said bulb connector strap; an electrically conductive ground connector strap mounted on said flat base portion of said base and having a resilient portion projecting forwardly from said flat base portion electrically connected to another terminal of said bulb; and a mounting member electrically connected to said ground connector strap and extending through said mounting hole in said base for receiving and electrically connecting said vehicle lamp to a vehicle.

2. A vehicle lamp according to claim 1 wherein said lens cover comprise four discrete side portions of uniform size whereby said lens cover is attachable in any of four positions with respect to said base.

3. A vehicle lamp according to claim 2 wherein the face portion of said lens, cover is convex, one surface of said face portions being smooth and the other surface of said face portion being provided with a plurality of indentations arranged in horizontal and vertical rows, each indentation comprising four triangularly shaped convex wall surfaces, said indentations forming said other surface into a plurality of light diffusing pillow blocks.

4. A vehicle lamp according to claim 1 wherein said bulb connector strap comprises at least one resiliently movable wire-engaging terminal portion having an edge associated with the inner end of said wire insertion hole and with a wire engaging portion of said projection for entapping a wire inserted through said wire insertion hole between said edge and said wire engaging portion.

5. A vehicle lamp according to claim 4 including at least on wire release tool hole extending through said projection from the rear of said flat base portion adjacent said wire insertion hole.

6. A vehicle lamp according to claim 5 comprising at least one wire accommodating hole in said rear flange.

7. A vehicle lamp according to claim 1 comprising a first drain hole extending through said flat base portion inside of said forward flange and said rear flange and a second drain hole extending through said rear flange.

8. A vehicle lamp according to claim 1 wherein said flat base portion is provided with an indentation exteriorly of said forward flange and beneath the lower edge of one of said plurality of side portions of said lens cover for receiving means for releasing said cover from said base.

* * * * *